United States Patent [19]
Albert et al.

[11] Patent Number: 6,002,087
[45] Date of Patent: Dec. 14, 1999

[54] VARIABLE COVERING DEVICE FOR ELECTRICAL WIRING CONDUIT

[75] Inventors: Christophe Albert, Pont Sainte Maxence; Régis Coutant, Vauciennes; Olivier Hery, Grand Fresnoy; Jean Claude Marcou, Limoges, all of France

[73] Assignee: Planet Wattohm, Senlis, France

[21] Appl. No.: 09/154,509

[22] Filed: Sep. 16, 1998

[30] Foreign Application Priority Data

Sep. 16, 1997 [FR] France ................................. 97 11490

[51] Int. Cl.⁶ ....................................................... H02G 3/10
[52] U.S. Cl. ........................ 174/48; 174/72 C; 52/718.04
[58] Field of Search ............................ 174/48, 49, 72 C; 439/207, 209, 925; 52/716.1, 716.8, 716.4, 718.04, 220.1

[56] References Cited

U.S. PATENT DOCUMENTS

| Re. 32,820 | 1/1989 | Pollack | 174/72 C X |
|---|---|---|---|
| 2,161,492 | 6/1939 | Wadsworth | 174/72 C X |
| 4,563,542 | 1/1986 | Pollack | 174/72 C X |
| 4,704,838 | 11/1987 | Wendt | 52/716.1 X |
| 5,777,270 | 7/1998 | West et al. | 439/207 X |

FOREIGN PATENT DOCUMENTS

| 0734107 | 9/1996 | European Pat. Off. . |
|---|---|---|
| 29611092 | 11/1996 | Germany . |
| 2031661 | 4/1980 | United Kingdom . |

*Primary Examiner*—Dean A. Reichard
*Attorney, Agent, or Firm*—Young & Thompson

[57] ABSTRACT

A variable covering device for electrical wiring conduit includes two semi-rigid material portions attached to each other by an arrangement forming a hinge, wherein at least one variable aperture notch is formed between those portions near the hinge and the notch is filled or covered by an attached closure member adapted to enable angular adjustment of the two portions relative to each other by the hinge.

13 Claims, 2 Drawing Sheets

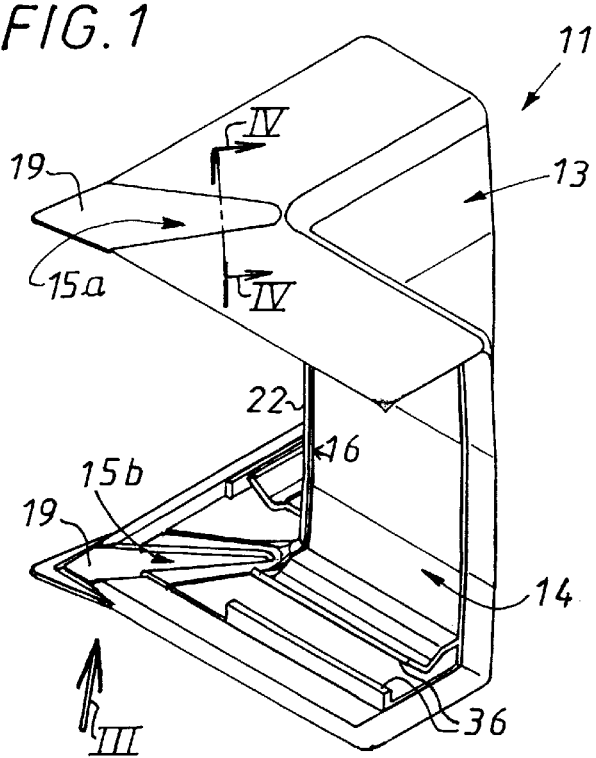
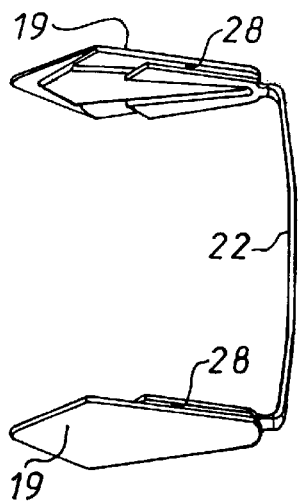
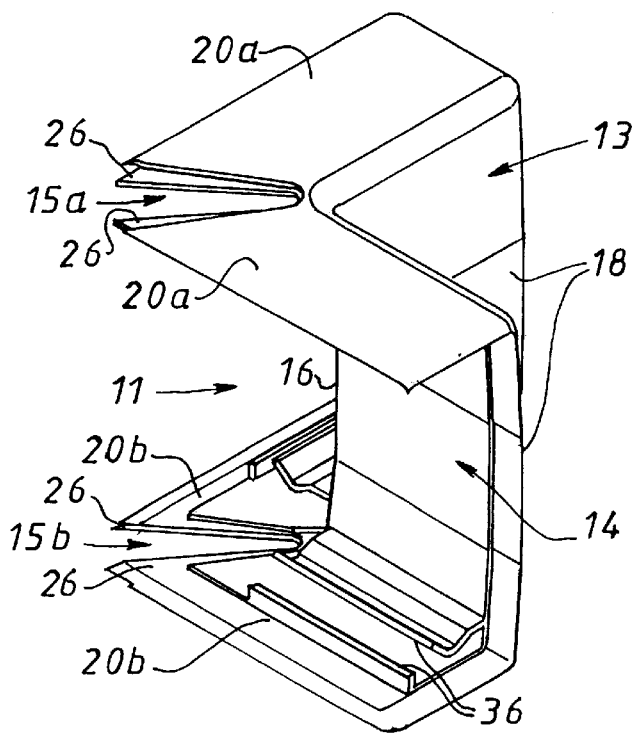
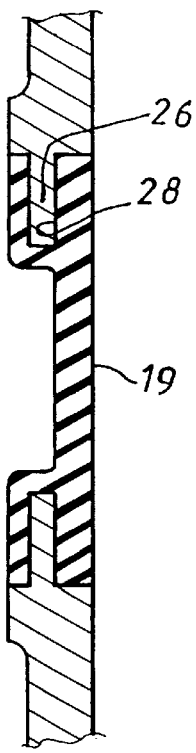

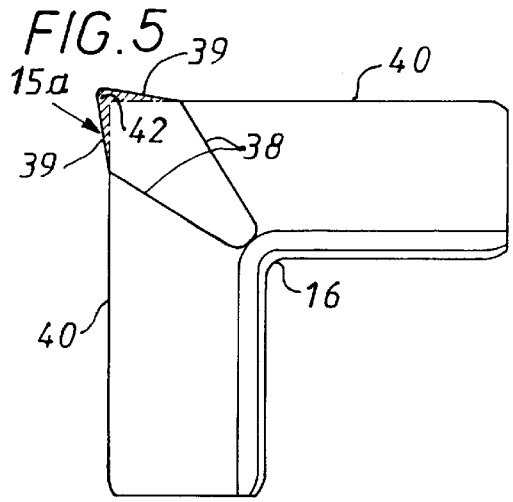
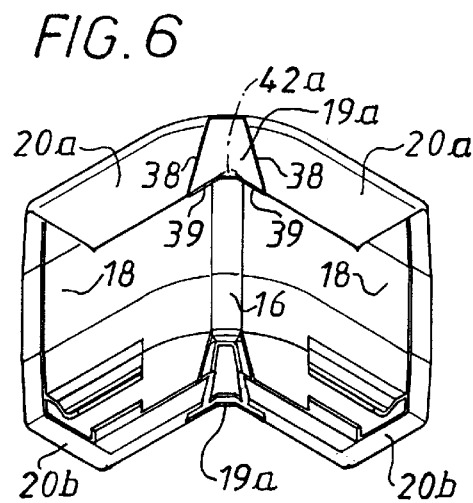
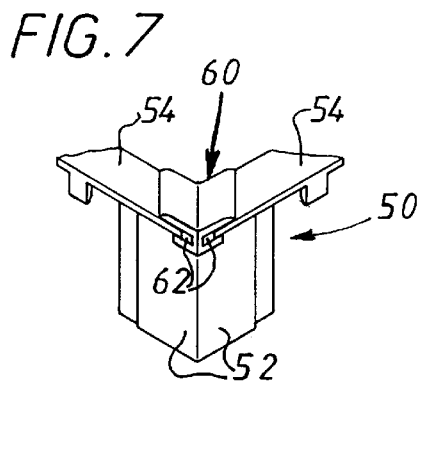
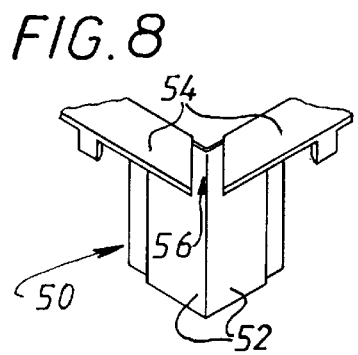
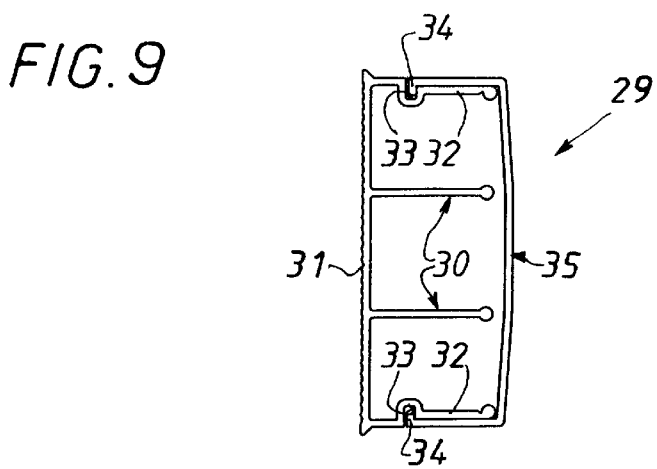

VARIABLE COVERING DEVICE FOR ELECTRICAL WIRING CONDUIT

BACKGROUND OF THE INVENTION

1. Field of the invention

The invention concerns a variable covering device for electrical wiring conduit, in particular of the "variable angle" type for covering two adjoining ends of portions of trunking to assure the continuity of the wiring conduit at locations where it changes direction. A variable angle covering device of the invention can in particular constitute an accessory known as an "inside corner" or "outside corner" when the change of direction of the conduit occurs in different planes or as a "flat corner" when the change of direction occurs in the same plane, on the surface of a wall.

2. Description of the prior art

In electrical installations using wiring conduit employing plastics material sections, fixing a U-shape first trunking section to the wall and covering this section with another section forming a cover that clips onto the U-shape section is known in itself. Accessories must be provided to cover the end parts of successive portions. It must be possible to adapt the accessories to suit various configurations, in particular changing from one wall to another or bypassing an obstacle, or a change of direction on a wall. Two trunking portions to be joined together are generally not strictly aligned with each other or perpendicular to each other. This is why it is desirable for the covering device that caps the ends of the trunking portions to be deformable without excessive stress so that it can be fitted over the adjoining ends of the trunking portions and cover them in a relatively sealed manner.

A prior art accessory for this purpose has two portions of semi-rigid material joined together by hinge means and having respective cylindrical surfaces with a variable overlap. The two cylindrical surfaces have the hinge axis as their rotation axis, enabling angular adjustment of the two sections relative to each other. This system is costly and the overlapping surfaces must in some cases be cut away on the inside so that they do not obstruct the wiring passage.

Another prior art system also includes a hinge linking the two portions and the dimensions of their cross-sections are different so that one of the portions can partially engage inside the other one by rotation about said hinge.

Apart from their high cost, these devices are somewhat unattractive. The invention solves these problems.

SUMMARY OF THE INVENTION

More particularly, the invention consists in a variable covering device for electrical wiring conduit comprising two semi-rigid material portions attached to each other by an arrangement forming a hinge, wherein at least one variable aperture notch is formed between said portions near said hinge and said notch is filled or covered by an separate closure member adapted to enable angular adjustment of said two portions relative to each other by means of said hinge.

Various embodiments conform to the above definition.

Accordingly, said closure member can include a deformable material member fixed laterally to the edges of said notch. Deformation of this member allows angular adjustment of the two sections relative to each other.

Alternatively, the closure member can form a double slot in which the edges of said slot engage with clearance. Although in this case the covering member is relatively rigid the clearance enables angular adjustment of two sections relative to each other, the member "floating" between them.

In the most usual situation in which the covering device comprises two portions with a globally U-shape profile, the profile has two parallel lateral flanges. In this case, each flange includes a notch near the hinge and each notch is filled in or covered by one of the aforementioned closure members.

The device can be molded open, closed or at 90°. The latter option is preferable because it corresponds to the most common configuration during installation and reduces the stresses when a deformable flexible part is associated with the rigid part. The device can then include a strip with an elbow and at least one lateral flange perpendicular to said strip. The notch is on the lateral flange near the elbow which is flexible and constitutes said hinge. The notch can extend between two portions at an angle of approximately 90° to each other, for example, and its edges can converge towards said hinge.

Said closure member then has two edges at an angle to each other corresponding to that between the edges of said notch and to which they are fixed. The closure member also includes two other edges approximately aligned with the respective free edges of said lateral flange, on respective opposite sides of said elbow.

The invention will be better understood and its other advantages will become more clearly apparent after reading the following description of various covering devices in accordance with the invention given by way of example only and with reference to the accompanying drawings.

BRIEF DESCRIPTION OF THE DRAWINGS

FIG. 1 is an overall perspective view of an "inside corner" covering device of the invention.

FIG. 2 is a perspective view of the semi-rigid material part of the device from FIG. 1.

FIG. 3 is a perspective view of the deformable and flexible material part of the device from FIG. 1 as seen in the direction of the arrow II in FIG. 1.

FIG. 4 is a partial sectional view to a larger scale taken along the line IV—IV in FIG. 4.

FIG. 5 is a plan view of FIG. 1.

FIG. 6 is a perspective view of an "outside corner" second embodiment of a covering device of the invention.

FIG. 7 is a perspective view of a third embodiment of a covering device of the invention.

FIG. 8 is a perspective view of the same device without the closure member.

FIG. 9 is a sectional view of an electrical wiring conduit with which a covering device of the invention can be used.

DETAILED DESCRIPTION OF THE PREFERRED EMBODIMENTS

FIGS. 1 through 5 show an "inside corner" variable covering device 11 comprising two semi-rigid material (molded plastics material) portions 13, 14 with a globally U-shape profile attached together in an arrangement forming a hinge 16 and two notches 15a, 15b of adjustable aperture formed between the two portions near said hinge 16. Each notch is filled in by a flexible and deformable material (for example, elastomer) closure member 19 to enable angular adjustment of the sections 13 and 14 relative to each other by means of said hinge. The closure member 19 is initially a separate part (here being made of a different material) and is fixed to the edges of the notch. To be more precise, as shown in FIG. 2, the semi-rigid material portions 13, 14 here form a single molded piece comprising a strip 18 (corresponding to the base of the U) which has an elbow at approximately 90° and two parallel lateral flanges 20a, 20b (corresponding to the parallel branches of the U) substantially perpendicular to the strip 18. Each notch 15a, 15b is on the corresponding lateral flange 20a, 20b near the elbow and makes the device more flexible so that of itself it constitutes the aforementioned hinge 16. Each notch is therefore substantially perpendicular to the elbow defining the hinge 16.

In the example shown the two closure members are attached to each other by a link 22 extending along the hinge. Said closure members 19 and the link 22 are molded in one piece from a flexible deformable material (see FIG. 3). The link 22 facilitates fitting the two closure members and holding them in place. It can be glued or otherwise fixed along the elbow forming the hinge 16.

In this example the edges of each notch are shaped to have thinner ribs 26 and the closure member 19 includes lateral slots 28 (FIG. 3) in which said ribs engage (FIG. 4). The assembly can be strengthened by gluing or welding. In particular, each closure member or the molded part shown in FIG. 3 can be attached to the two portions or to the rigid part by dual-material injection molding. This type of assembly provides a particularly attractive configuration in which the outside face of each closure member 19 is in the same plane as the outside face of the lateral flange 20a or 20b to which it is attached (FIG. 1).

FIG. 9 is a cross-sectional view of a conventional conduit 29 for electrical cables made up of two sections 30, 35 fitted one over the other. The first trunking section 30 is adapted to be fixed to a wall by its base 31. The base is flanked by two longitudinal flanges 32 substantially perpendicular to it and each incorporating a longitudinal groove 33 adapted to receive the curved longitudinal edges 34 of the second section 35 which forms a cover.

At one end of the wall on which it is mounted the trunking section 30 is cut to length and connected to another of the same type fixed to the adjacent wall. The same goes for the section forming the cover. It is at these corner connections that a covering device of the invention is used to conceal the cut ends of the trunking and the cover and thereby assure the "continuity" of the conduit.

The free edges of the flanges 20a, 20b and/or of the strip 18 are thinner and tapered so as to better cover the adjacent and perpendicular ends of the conduit to give a visual impression of continuity. The inside faces of the flanges 20a, 20b of the device are provided with fixing ribs 36 for "clipping" the device onto each conduit end so as to cover the corresponding ends of the covers (cut shorter).

FIG. 5 in particular shows that each notch lies between two portions 13, 14 at an angle of approximately 90° to each other and that the edges of the notch converge towards the elbow defining the hinge 16. The closure member 19 has two edges 38 at an angle to each other corresponding to that between the edges of the notch and to which they are fixed. Said closure member further includes two other edges 39 approximately aligned with the respective free edges 40 of said lateral flange 20a, 20b, on respective opposite sides of the elbow defining the hinge 16.

In the case of an inside corner as shown in FIGS. 1 through 5 the closure member has an area 42 projecting relative to the corner formed by the extensions of the free edges of the corresponding lateral flange. This projecting area is shaded in FIG. 5. If the two approximately perpendicular walls to which the trunking sections are fixed are at an angle to each other of slightly less than 90°, forcible fitting of the covering device will widen the notch and therefore stretch the covering member and this stretching will absorb the projecting area 42 whilst maintaining contact with the walls. In the contrary case the projecting area will curve along the walls.

FIG. 6 shows another "outside corner" covering device that can be used with the same conduits. This device has the same main components and these are identified by the same reference numbers as in FIGS. 1 through 5. This time the strip 18 forms an outside corner, the essential difference lying in the shape of each closure member 19a which this time is adapted to suit the configuration of an outside corner between walls.

However, as in the previous embodiment, each closure member has two edges 38 at an angle to each other corresponding to that between the edges of the notch and two other edges 39 approximately aligned with respective free edges of the lateral flange 20a, 20b on respective opposite sides of the elbow. Each closure member 19a also has a small area 42a projecting relative to the corner formed by said free edges of the lateral flange that has the same functions as in the previous example.

Turning to feasible variants, the two portions 13 and 14 could, instead of constituting a single molded part as shown in FIG. 2, comprise two separate parts fixed to respective opposite ends of a part molded from a flexible deformable material like that shown in FIG. 3, i.e. including two closure members and a link 22. The two portions 13 and 14 could, for example, be welded to respective opposite sides of a part of the above kind molded from a flexible deformable material using dual-material injection molding. In this case the link 22 is an integral part of the hinge.

In the embodiment of FIGS. 7 and 8 there is a molded semi-rigid material part 50 comprising a strip 52 with an elbow and at least one lateral flange 54 perpendicular to the strip with the elbow and including a notch 56 near the elbow. This part is shown in FIG. 8. The essential difference resides in the structure of the closure member 60 which is molded from a relatively rigid material and includes a double slot 62 by means of which said closure member is engaged with clearance in the notch. The closure member 60 is a separate piece, attached to the notch without being joined to the part 50.

As can be seen in FIG. 7 the clearance is sufficient not to impede angular adjustment of the two sections relative to each other. The closure member covers the notch regardless of the angle imparted to the covering device when it is fixed between the two parts of the conduit that it covers.

The same concept can be applied to a "flat corner" connecting device, the hinge being defined at the elbow but on one lateral flange of the section.

There is claimed:

1. A variable covering device for electrical wiring conduit comprising:

two semi-rigid material portions attached to each other by an arrangement forming a hinge, wherein at least one variable aperture notch is formed between said portions near said hinge and said at least one notch is covered by a of two closure members adapted to enable angular adjustment of said two portions relative to each other by means of said hinge; and two parallel lateral flanges each including one of said at least one notch near said hinge, each notch being covered by one of said two closure members.

2. The device claimed in claim 1, wherein each of said two closure members is made of a deformable material and is fixed laterally to edges of said at least one notch.

3. The device claimed in claim 1, including a strip having an elbow and at least one lateral flange substantially perpendicular to said strip, said at least one notch being on said lateral flange near said elbow so that said elbow is flexible and constitutes said hinge.

4. The device claimed in claim 1, wherein an exterior face of at least one of said closure members is in the same plane as an exterior face of the lateral flange to which it is attached.

5. The device claimed in claim 1, wherein edges of said at least one notch include thinner ribs and the corresponding closure member includes lateral slots in which said ribs engage.

6. The device claimed in claim 1, wherein each of said two closure members is glued to said two portions.

7. The device claimed in claim 1, wherein each of said two closure members is attached to said two portions by dual-material injection molding.

8. The device claimed in claim 1, wherein said two closure members are attached to each other by a link extending along said hinge.

9. The device claimed in claim 8, wherein each of said two closure members includes an area projecting relative to a corner formed by free edges of one of said two parallel lateral flanges.

10. The device claimed in claim 8, wherein said two closure members and said link are molded in one piece from a flexible deformable material.

11. The device claimed in claim 10, wherein said two semi-rigid material portions are fixed to respective opposite sides of a part molded from a flexible deformable material.

12. A variable covering device for electrical wiring conduit comprising:

two semi-rigid material portions attached to each other by an arrangement forming a hinge, wherein at least one variable aperture notch is formed between said portions near said hinge and said at least one notch is covered by one of two closure members adapted to enable angular adjustment of said two portions relative to each other by means of said hinge; and two parallel lateral flanges each including one of said at least one notch near said hinge, each notch being covered by one of said two closure members; and a strip having an elbow and at least one lateral flange substantially perpendicular to said strip, said at least one notch being on said lateral flange near said elbow so that said elbow is flexible and constitutes said hinge, wherein said at least one notch is between said two portions at an angle of approximately 90° to each other, edges of said at least one notch converge towards said hinge and said closure member has two edges at an angle to each other corresponding to that between the edges of said at least one notch and to which they are fixed and two other edges approximately aligned with respective free edges of said at least one lateral flange on respective opposite sides of said elbow.

13. A variable covering device for electrical wiring conduit comprising:

two semi-rigid material portions attached to each other by an arrangement forming a hinge, wherein at least one variable aperture notch is formed between said portions near said hinge and said at least one notch is covered by one of two closure members adapted to enable angular adjustment of said two portions relative to each other by means of said hinge; and two parallel lateral flanges each including one of said at least one notch near said hinge, each notch being covered by one of said two closure members, wherein each said closure member is made of a relatively rigid material and forms a double slot in which edges of the corresponding notch of said at least one notch engage with clearance.

* * * * *